(12) United States Patent
Ruiz

(10) Patent No.: US 6,302,243 B1
(45) Date of Patent: Oct. 16, 2001

(54) STIFFENING BRACKET FOR BRAKE CALIPERS

(75) Inventor: Stephen John Ruiz, Redondo Beach, CA (US)

(73) Assignee: Stoptech Technologies LLC, Torrance, CA (US)

( * ) Notice: Subject to any disclaimer, the term of this patent is extended or adjusted under 35 U.S.C. 154(b) by 0 days.

(21) Appl. No.: 09/429,890

(22) Filed: Oct. 29, 1999

(51) Int. Cl.$^7$ .................................................. F16D 65/00
(52) U.S. Cl. .................. 188/73.1; 188/73.36; 188/73.37
(58) Field of Search ............................... 188/72.1, 73.36, 188/73.37, 73.1, 73.47, 370, 73.32, 73.38

(56) References Cited

U.S. PATENT DOCUMENTS

| | | | |
|---|---|---|---|
| 3,625,316 | * | 12/1971 | Mori ..................................... 188/73.5 |
| 3,692,151 | * | 9/1972 | Kobayashi et al. .................. 188/72.5 |
| 4,039,054 | * | 8/1977 | Rath ..................................... 188/73.4 |
| 4,570,759 | * | 2/1986 | Ferret Bofill et al. ............. 188/73.32 |
| 4,658,891 | * | 4/1987 | Wurtz ..................................... 165/92 |
| 4,749,066 | * | 6/1988 | Garrett et al. ...................... 188/73.32 |
| 5,178,236 | * | 1/1993 | Terashima ........................... 188/73.45 |
| 5,259,484 | * | 11/1993 | Idesawa et al. ..................... 188/73.45 |
| 5,330,035 | * | 7/1994 | Klimt et al. ........................ 188/73.36 |
| 5,657,837 | * | 8/1997 | Yamadera et al. ................. 188/73.45 |
| 5,875,873 | * | 3/1999 | Kay et al. ........................... 188/73.38 |

FOREIGN PATENT DOCUMENTS

| 3736126 | * | 5/1989 | (DE) . |
|---|---|---|---|
| 0349386 | * | 3/1990 | (EP) . |
| 57103940 | * | 6/1982 | (JP) . |

\* cited by examiner

*Primary Examiner*—Robert Oberleitner
*Assistant Examiner*—Melody M. Burch
(74) *Attorney, Agent, or Firm*—Blakely Sokoloff Taylor & Zafman

(57) ABSTRACT

A stiffening bracket for a brake caliper that includes an aperture. The aperture has a diagonal length. The bracket includes a support having a first end and a second end. The bracket also includes a first extension attached to the first end and a second extension attached to the second end of the support. A length measured from the first extension to the second extension of the bracket is less than or equal to the diagonal length of the aperture.

21 Claims, 2 Drawing Sheets

STIFFENING BRACKET FOR BRAKE CALIPERS

BACKGROUND OF THE INVENTION

1. Field of the Invention

The invention relates to a disc brake caliper having a bracket that stiffens the rectangular shaped aperture within the caliper against the parallelogram effect.

2. Background Information

Friction brakes are used in cars, trains, airplanes, elevators, and other machines. For each wheel of an automobile, conventional disk-type brakes include two opposing steel plates, each faced with a heat- and wear-resistant lining known as a brake pad. Between a pair of brake pads is a brake rotor that rotates as the axle of the automobile turns from power transmitted by an engine. The brake rotor provides two heat dissipating surfaces, against which a pair of brake pads may be applied so as to slow a vehicle down or bring it to rest through controlled slippage. The brake rotor is formed of two annular rings, within which are radially extending channels that force air from the interior surface of the rings to the exterior surface of the rings. The passing air draws heat from the brake rotor and expels it radially outward in the direction of the moving brake rotor.

To apply the steel plate backed brake pads against the brake rotor, each plate is backed by two hydraulic pistons that cause the plates to move in the axial direction. These pistons are housed in cylindrical piston bores located in two C-shaped (or U-shaped) bodies. Each C-shaped body includes two arms extending from a base that supports the piston bores. When the two C-shaped bodies are bolted together, an access aperture is formed as the middle of a rectangular shape formed by the two C-shaped bodies. This aperture permits installation and removal of the brake pads from a position that is radially above the axle of the automobile. The device consisting of the two plates lined with a frictional material that is pressed against the sides of the brake rotor (or "disc") is known as a disc brake caliper.

In order to slow or stop an automobile, a driver steps on a brake pedal. Movement of the brake peddle operates a valve that allows one side of a piston to be exposed to atmospheric pressure, while engine-intake manifold vacuum is applied to the other side of that piston. This great difference in pressure causes the piston to move. This movement is transmitted through high hydraulic pressure to the pistons disposed about each opposing pair of brake pads. As pedal pressure is applied by the driver, the brake pads are forced against each surface of the rotating brake rotor by these pistons. The friction interface between the pads and the rotor surface slows the vehicle down or brings it to rest through controlled slippage.

During the friction interface between the brake pads and the disc rotor, a variety of forces work against the rectangular shape of the caliper in an effort to distort this shape. For example, the hydraulic pressure applied within the piston bores against the pistons works to distort the cylindrical shape of the bore. This hydraulic pressure also presses against each caliper plate so as to push each place in the axial direction. Since brakes primarily are applied as an automobile is traveling, there is a torque reaction in the direction of rotation of the brake rotor that is applied against an internal face of one pair of opposing arms of the plates. Conventionally, this internal face includes a stainless steel surface that permits the brake pads to slide smoothly on the internal surface of that leading end.

The force against the stainless steel surface in a rectangular shape caliper causes the caliper to act like a four-bar linkage out of the rectangular shape with the stainless steel surface posing as a fixed linkage. The variety of forces developed within the caliper work to rotate this four-bar linkage in one direction or another so that the internal right angles of the rectangular shape become the obtuse and acute angles of a parallelogram. However, due to the rigidity of the C-shaped bodies and the uneven application of the forces developed within the caliper, the rectangular shape caliper design actually becomes S-shaped as a result of this parallelogram effect. The S-shape becomes especially pronounced at the trailing end of the caliper.

The parallelogram effect results in unusual wear on the surfaces of the brake pads. This unusual wear not only decreases the overall performance of the brake pads, but increases the vibration noise emanating from the brake pads just after the pads separate from the brake rotor. This makes it more difficult for automobiles to meet federal Noise Vibration of Harshness (NVH) standards. Thus, what is needed is a device to stiffen the rectangular shape within the caliper against the brake torque reaction forces resulting in the parallelogram effect.

SUMMARY OF THE INVENTION

A stiffening bracket for a brake caliper that includes an aperture. The aperture has a diagonal length. The bracket includes a support having a first end and a second end. The bracket also includes a first extension attached to the first end and a second extension attached to the second end of the support. A length measured from the first extension to the second extension of the bracket is less than or equal to the diagonal length of the aperture.

DETAILED DESCRIPTION OF THE INVENTION

Figure 1:
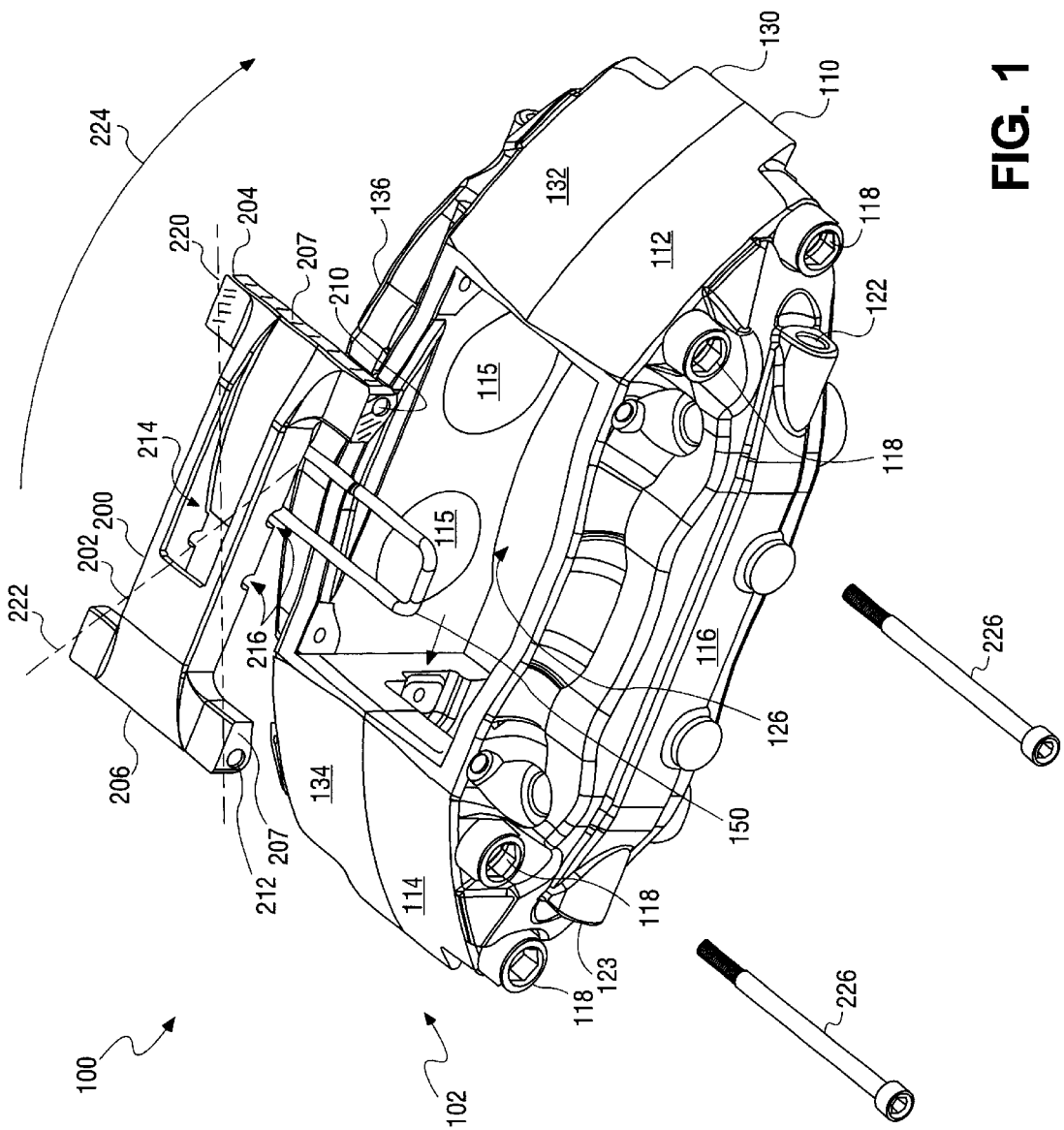
FIG. 1 is an exploded isometric view of caliper assembly 100 of the invention.
Figure 2:
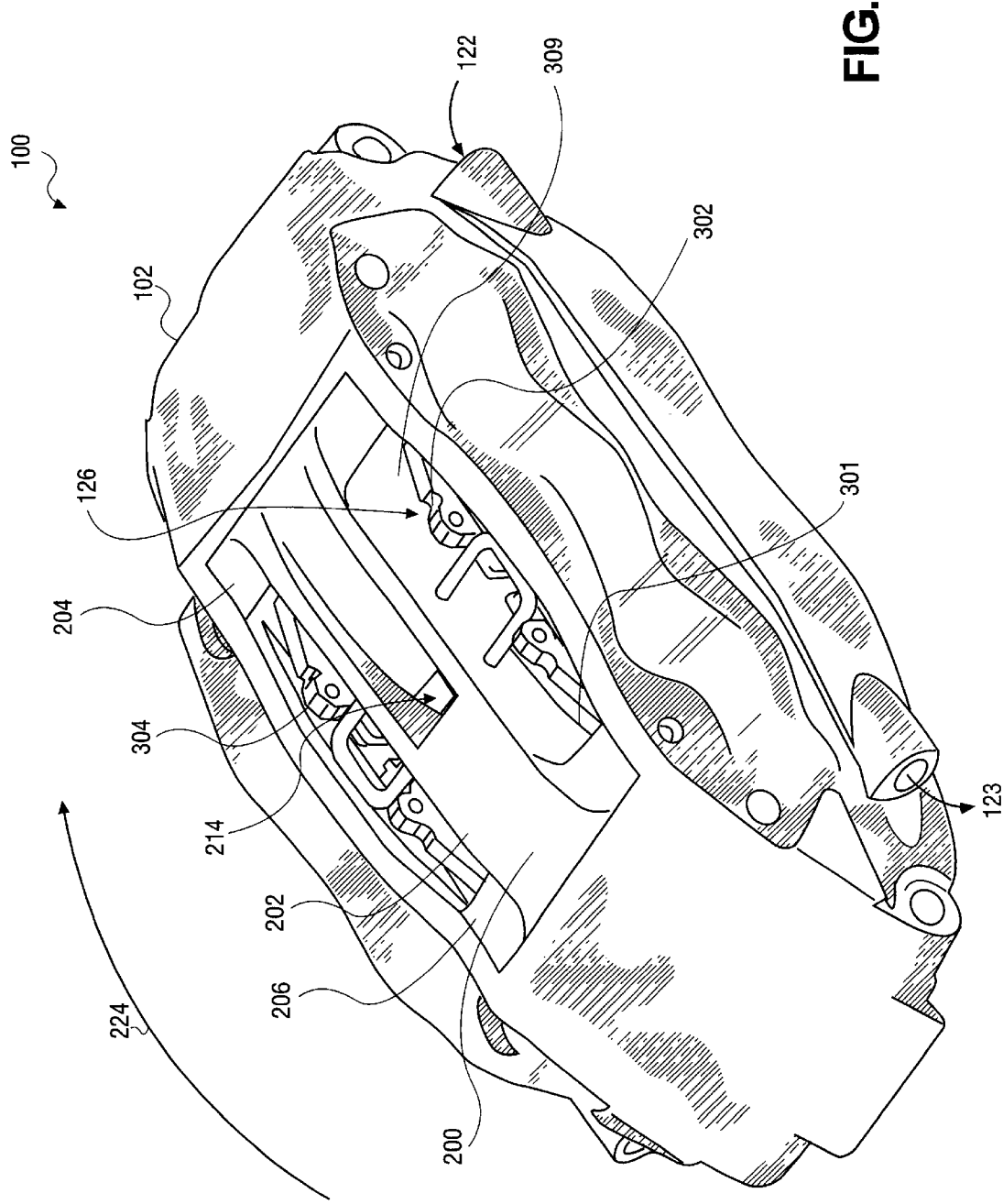
FIG. 2 illustrates an embodiment of assembled caliper assembly 100.

FIG. 1 is an exploded isometric view of caliper assembly 100 of the invention. Included with caliper assembly 100 may be first body 110, second body 130, clip 150, bracket 200 and, as seen in FIG. 2, two opposing steel plates 302 and 304, each faced by brake pads 301 and 305, respectively, as well as backed by pistons (not shown). These pistons are housed in cylindrical piston bores 115 shown in FIG. 1.

First body 110 preferably is a C-shaped (or U-shaped) body having arm 112 and arm 114 extending from base 116. Second body 130 preferably is a C-shaped (or U-shaped) body having arm 132 and arm 134 extending from base 136. First body 110 and second body 130 may be secured to each other as main body 102 through bolts 118. This places each piston bore 115 in fluid communication with a hydraulic line that may be coupled to hydraulic pressure inlet port 122 and hydraulic pressure outlet port 123 formed in first body 110. First body 110 and second body 130 may also be formed as one solid body, shown as main body 102 in FIG. 2.

When the two C-shaped bodies 110 and 130 are bolted together, access aperture 126 is formed as the middle of a rectangular shape formed by first body 110 and second body 130. Aperture 126 may be any opening having two diagonally opposing features. For example, these features may be corners. Aperture 126 also may be a quadrilateral figure such as a trapezoid or square. Moreover, aperture 126 may also be a right-lined quadrilateral figure whose opposite sides are parallel and consequently equal, or a quadrilateral figure that is longer than it is broad, such as a rectangle.

To stiffen the rectangular shape seen as aperture 126 in FIG. 1, the invention provides bracket 200 disposed within aperture 126 as seen in the embodiment illustrated in FIG. 2. FIG. 2 illustrates an embodiment of assembled caliper assembly 100. In one embodiment, bracket 200 is a solid rectangular block of metal disposed within aperture 126. However, a solid block of metal prevents inspection of brake pads 301 and 305 as well as blocks the passage of air from the brake rotor. Thus, material preferably is removed from bracket 200 so as to permit brake pad wear inspection and ventilation of the brake rotor, while maintaining the necessary stiffening support that a solid block of metal provides to caliper assembly 100.

The forces that are to be countered by bracket 200 include those forces that work to change the internal right angles of the rectangular shape aperture 126 to the obtuse and acute angles of a parallelogram. Thus, it is important that bracket 200 tie together the diagonally opposing corners of aperture 126.

In a preferred embodiment of the invention, bracket 200 includes support 202 having first extension 204 at one end and second extension 206 at the other end. Both first extension 204 and second extension 206 include precision surfaces 207 disposed about their exterior perimeters as well as include through holes 210 and 212, respectively. Precision surfaces 207 may include surfaces that are flat and free from scratches, dents, steps, or flaws exceeding forty microinches in depth. The flatness of precision surfaces 207 may be where the entire surface resides between two parallel planes located 0.005 inches apart. Support 202 preferably does not extend out to the axial tips of the extensions 204 and 206 since this narrowing of support 202 forms gap 309 of FIG. 2 that permits a user to visually inspect the wear of brake pads 301 and 305.

Although bracket 200 visually appears as an I-shape in FIG. 1, the stiffening support it offers aperture 126 principally comes from opposing the movements of the diagonally opposing corners of aperture 126. Under four-bar linkage theory, when the length between a first pair of diagonally opposing corners increases, the length between the second pair of diagonally opposing corners decreases. A stiffener coupled between this first pair of diagonally opposing corners would be placed in tension as it prevents the increasing of the diagonal length. A stiffener coupled between the second pair of diagonally opposing corners would be placed in compression as it prevents the decreasing of the diagonal length. For the invention, either the increase or decrease of the diagonal length may be restricted.

In one embodiment of the invention, the diagonally opposing corners are coupled to each other by a linkage so as to prevent the increasing of the diagonal length. For example, a bolt may be secured in holes drilled from one corner to the corner diagonally opposing it. However, experiments have shown that preventing the decreasing of the diagonal length permits bracket 200 to be easily installed and removed. Thus, under the view of preventing the decreasing of the diagonal length, bridge or bracket 200 is an X-shaped bracket as illustrated by lines 220 and 222 of FIG. 1. Here, bracket 200 includes any lightened shape designed to control the parallelogram effect compressively.

Within support 202 may be vent 214 and grooves 216. Vent 214 preferably is shaped to slice off from the brake rotor (not shown) the air that is expelled radially outward from the brake rotor. The shape of vent 214 preferably includes an air-foiled shaped lip that extends down towards the interior of caliper assembly 100 in the opposite direction of the flow of air from the rotating brake rotor. Thus, as the brake rotor spins past vent 214 in direction of rotation 224, vent 214 shears air away from the brake rotor. Shearing air away from the brake rotor directs that air to align itself with the tangential direction of the brake rotor. This improves the venting of air from the brake rotor so as to mitigate the air blocking effects of adding bracket 200 to caliper assembly 100.

Grooves 216 permit installation of clip 150 over plates 302 and 304. As shown in FIG. 2, clip 150 retains brake pads 301 and 305 within caliper assembly 100. One unique feature of bracket 200 is that it allows easy removal of brake pads 301 and 305 and still builds stiffness in caliper assembly 100 when installed. To install bracket 200, bracket 200 is placed over clip 150 and into aperture 126 so that through holes 210 and 212 align with complementary holes formed into first body 110 and second body 130. Bracket bolts 226 may then be threaded through these holes and screwed into the internally threaded holes located in second body 130. The internally threaded holes located in second body 130 may be threaded inserts placed into holes formed into second body 130. Bracket 200 may also be secured to caliper assembly 100 by a quick release mechanisms such as pip pins which may be viewed as spring backed balls forced into detents.

Bracket 200 preferably fits with precision within aperture 126, both in the longitudinal direction and axial direction of caliper assembly 100. A tight fit helps to insure that bracket 200 takes the cross-compressive forces of aperture 126 rather than visiting these forces upon bracket bolts 226.

Experiments with bracket 200 show that the overall stiffness of caliper assembly 100 is improved by three times its prior stiffness. In one experiment without a torque reaction that applied two of the three forces to a caliper assembly, the displacement of the extreme fiber of the disc was 0.01480 inches without bracket 200 installed and 0.00540 inches with bracket 200 installed. With the addition of torque reaction applied at a high rate of braking, the displacement of the extreme fiber of the disc was 0.00130 inches without bracket 200 installed and 0.00031 inches with bracket 200 installed.

By reducing the distortion of brake caliper assembly 100, brake pads 301 and 305 wear more evenly. This works towards meeting theoretical expectations of brake pad performance as well as decreases the amount of vibration noise emanating from the brake pads. This, in turn, makes it easier for automobiles to meet federal Noise Vibration of Harshness (NVH) standards.

The exemplary embodiments described herein are provided merely to illustrate the principles of the invention and should not be construed as limiting the scope of the subject matter of the terms of the claimed invention. The principles of the invention may be applied toward a wide range of systems to achieve the advantages described herein and to achieve other advantages or to satisfy other objectives, as well.

What is claimed is:

1. A stiffening bracket for a brake caliper having an aperture, the aperture having two diagonally opposing features, each of the diagonally opposing features defined by a length therebetween, the bracket comprising:

a support having a first end and a second end;

a first extension coupled to the first end; and a second extension coupled to the second end, wherein said first extension and said second extension are securable to the brake caliper such that a change in the length between the two diagonally opposing features of the aperture is restricted, said support, the first extension, and the second extension each having a width, wherein the width of the support is less than the width of the first extension and the width of the second extension, wherein the bracket reduces distortion of the brake caliper and reduces uneven wear on at least one brake pad.

2. The bracket of claim 1, wherein the first and second extensions are disposed within the aperture of the brake caliper.

3. The bracket of claim 1, wherein the support includes a vent.

4. The bracket of claim 3, wherein the vent includes an air-foiled shaped lip that extends from a first surface of the support to a second surface of the support to shear air away from a brake rotor.

5. The bracket of claim 1, wherein the support includes at least one groove.

6. The bracket of claim 5, further comprising:
a clip disposed within the at least one groove.

7. The bracket of claim 1, wherein the first extension and the second extension each have a hole disposed through the width of that extension.

8. An exterior perimeter, wherein the exterior perimeter of the first extension and the second extension includes a precision surface.

9. A brake caliper assembly comprising:
a brake caliper body including an aperture, the aperture having two diagonally opposing features, each of said diagonally opposing features defined by a length therebetween; and means for restricting a change in the length between the two diagonally opposing features of the aperture, the means for restricting secured to said brake caliper body, wherein the means for restricting comprises a bracket including a support having a first end and a second end, a first extension coupled to the first end, and a second extension coupled to the second end, said support, the first extension, and the second extension each having a width, the width of the support is less than the width of the first extension and the width of the second extension, wherein the bracket reduces distortion of the brake caliper body and reduces uneven wear on at least one brake pad.

10. The brake caliper assembly of claim 9 wherein the means for restricting is disposed within the aperture.

11. The brake caliper assembly of claim 10, wherein the two diagonally opposing features are a first corner and a second corner, wherein the means for restricting includes the bracket disposed between the two diagonally opposing corners of the aperture.

12. The brake caliper assembly of claim 11, wherein a length measured from the first extension to the second extension is less than or equal to the diagonal length of the aperture and wherein the support includes a vent.

13. The brake caliper assembly of claim 12, wherein the vent includes an air-foiled shaped lip that extends from a first surface of the support to the second surface of the support.

14. The brake caliper assembly of claim 11, wherein the support includes at least one groove, the assembly further comprising:

a clip disposed within the at least one groove.

15. The brake caliper assembly of claim 11, the support, the first extension, and the second extension each having a width, wherein the width of the support is less than the width of the first extension and the width of the second extension, and wherein the first extension and the second extension each have a hole disposed through the width of that extension, and wherein the exterior perimeter of the first extension and the second extension includes a precision surface.

16. The brake caliper assembly of claim 10, wherein the means for restricting includes the bracket coupled between the two diagonally opposing features of the aperture.

17. The brake caliper assembly of claim 16, wherein the two diagonally opposing features are a first corner and a second corner, the assembly further comprising:

a plurality of holes drilled from a first side adjacent to the first corner to a second side adjacent to the second corner, the bracket including a bolt secured in the plurality of holes.

18. A brake caliper assembly comprising:
a brake caliper body including an aperture, the aperture having two diagonally opposing features, each of said diagonally opposing features defined by a length therebetween; and a bracket secured to said brake caliper body such that a change in the length between the two diagonally opposing features of said aperture is restricted, wherein said bracket comprises a first extension and a second extension and a support coupled between said first and second extensions, said support, the first extension, and the second extension each having a width, wherein the width of the support is less than the width of the first extension and the width of the second extension, wherein the bracket reduces distortion of the brake caliper body and reduces uneven wear on at least one brake pad.

19. The brake caliper assembly of claim 18, wherein said support includes a vent having an air-foiled shaped lip that extends from a first surface of the support to a second surface of the support.

20. A stiffening bracket for a brake caliper having an aperture, the aperture having two diagonally opposing features, each of the diagonally opposing features defined by a length therebetween, the bracket comprising:

a support having a first end and a second end;
a first extension coupled to the first end; and
a second extension coupled to the second end, wherein said first extension and said second extension are securable to the brake caliper such that a change in the length between the two diagonally opposing features of the aperture is restricted, wherein the support includes a vent having an air-foiled shaped lip that extends from a first surface of the support to a second surface of the support to shear air away from a brake rotor, wherein the bracket reduces distortion of the brake caliper and reduces uneven wear on at least one brake pad.

21. A brake caliper assembly comprising:
a brake caliper body including an aperture, the aperture having two diagonally opposing features, each of said diagonally opposing features defined by a length therebetween; and a bracket secured to said brake caliper body such that a change in the length between the two diagonally opposing features of said aperture is restricted, said bracket including a first extension and a second extension and a support coupled between said first and second extensions, said support includes a vent having an air-foiled shaped lip that extends from a first surface of the support to a second surface of the support, wherein the bracket reduces distortion of the brake caliper body and reduces uneven wear on at least one brake pad.

* * * * *

UNITED STATES PATENT AND TRADEMARK OFFICE
CERTIFICATE OF CORRECTION

PATENT NO.    : 6,302,243 B1
DATED         : October 16, 2001
INVENTOR(S)   : Ruiz It is certified that error appears in the above-identified patent and that said Letters Patent is hereby corrected as shown below:

<u>Title page,</u>
Item [73], Assignee, please delete "Stoptech" and insert -- Stop --.

<u>Column 1,</u>
Line 42, delete "peddle" and insert -- pedal --.

<u>Column 6,</u>
Line 2, after "assembly of claim 11," delete "the support, the first extension, and the second extension each having a width, wherein the width of the support is less than the width of the first extension and the width of the second extension, and"
Line 25, delete "ther-" and insert -- there- --.

Signed and Sealed this

Seventeenth Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.   : 6,302,243 B
DATED        : October 16, 2001
INVENTOR(S)  : Ruiz

It is certified that error appears in the above-identified patent and that said Letters Patent is hereby corrected as shown below:

Title page,
Item [56], References Cited, U.S. PATENT DOCUMENTS, insert
-- 3,937,304   2/1976     Brix
   4,465,164   8/1984     Anderson
   4,538,708   9/1985     Seki
   5,002,161   3/1991     Pindat
   5,358,079   10/1994    Brown
   5,472,067   12/1995    Fujiwara --.

Signed and Sealed this

Nineteenth Day of October, 2004

JON W. DUDAS
*Director of the United States Patent and Trademark Office*